(12) United States Patent
Lim

(10) Patent No.: US 8,660,374 B1
(45) Date of Patent: Feb. 25, 2014

(54) SELECTING TRANSFORM PATHS FOR COMPRESSING VISUAL DATA

(75) Inventor: Jae S. Lim, Winchester, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 95 days.

(21) Appl. No.: 13/336,213

(22) Filed: Dec. 23, 2011

(51) Int. Cl.
*G06K 9/36* (2006.01)

(52) U.S. Cl.
USPC ........... 382/232; 382/240; 382/244; 382/245; 382/246; 382/250

(58) Field of Classification Search
USPC ......... 382/232, 233, 236, 238, 240, 244, 245, 382/246, 247, 248, 250, 251; 345/555; 348/384.1, 101.1, 403.1, 407.1, 409.1; 375/240.01, 240.02, 240.03, 240.12, 375/240.16
See application file for complete search history.

(56) References Cited

U.S. PATENT DOCUMENTS

| | | | |
|---|---|---|---|
| 4,504,860 A | 3/1985 | Nicol et al. | |
| 5,432,555 A | 7/1995 | Park | |
| 5,495,244 A | 2/1996 | Jeong et al. | |
| 6,408,029 B1 | 6/2002 | McVeigh et al. | |
| 6,917,717 B2 * | 7/2005 | Simard et al. | 382/240 |
| 7,352,811 B2 | 4/2008 | Stone et al. | |
| 7,656,949 B1 * | 2/2010 | Zhang et al. | 375/240.02 |
| 7,787,754 B2 * | 8/2010 | Patera et al. | 386/212 |
| 8,451,903 B2 * | 5/2013 | Kamisli et al. | 375/240.2 |
| 2003/0118117 A1 | 6/2003 | McVeigh et al. | |
| 2003/0128753 A1 | 7/2003 | Lee et al. | |
| 2003/0156648 A1 | 8/2003 | Holcomb et al. | |
| 2007/0053604 A1 | 3/2007 | Lee et al. | |
| 2007/0098063 A1 | 5/2007 | Reznic et al. | |
| 2007/0263721 A1 | 11/2007 | Lim | |
| 2007/0297503 A1 | 12/2007 | Reznik | |
| 2008/0008246 A1 | 1/2008 | Mukherjee et al. | |
| 2008/0273810 A1 | 11/2008 | Subramania et al. | |
| 2008/0310512 A1 | 12/2008 | Ye et al. | |
| 2010/0290520 A1 | 11/2010 | Kamisli et al. | |
| 2011/0286525 A1 | 11/2011 | Kamisli et al. | |

FOREIGN PATENT DOCUMENTS

JP 2008-197917 8/2008

OTHER PUBLICATIONS

Article—Haar wavelet transform with interband prediction and its application image coding; Nobutaka Kuroki, et al.; Graduate School of Science and Technology; Kobe University, Kobe, Japan 657, date Dec. 1994.

Directional Discrete Cosine transforms—A New Framework for Image Coding; Bing Zeng, et al.; IEEE Transactions on Circuits and Systems for Video technology, vol. 18, No. 3, Mar. 2008.

(Continued)

*Primary Examiner* — Ali Bayat
(74) *Attorney, Agent, or Firm* — Occhiuti & Rohlicek LLP

(57) ABSTRACT

Encoding data includes: determining multiple patterns for computing one-dimensional transforms over a first array of data elements. Each pattern includes multiple subsets of data elements of the first array. Each subset included in a first pattern has substantially the same number of data elements as each of the other subsets included in the first pattern. Each data element of the first array is included in a single one of the subsets included in the first pattern. At least one subset included in the first pattern consists of data elements that are not in a contiguous sequence along a single dimension. Encoding the data includes: computing, for each pattern, multiple one-dimensional transforms over data elements of respective subsets included in the pattern selecting a set of transform coefficients from a group of multiple sets of transform coefficients; and encoding the selected set of transform coefficients to represent the first array.

57 Claims, 9 Drawing Sheets

(56) References Cited

OTHER PUBLICATIONS

Surface Compression with Geometric Bandelets; Gabriel Peyre, et al.; CMAP, Ecole Polytechnique; Copyright 2005 by the Association for Computing Machinery, Inc.; pp. 601-608.

Sparse Geometric Image Representations With Bandelets; Erwan Le Pennec et al.; IEEE Transactions of Image Processing, vol. 14, No. 4, Apr. 2005.

One Dimensional Transform for H.264 Based Intra Coding; Yumi Sohn, et al.; Digital Media R&D Center; Samsung Electroncs, Co., Suwon, Korea; Picture Coding Symposium 2007; Nov. 7-9, 2007, Lisboa, Portugal.

Directional residue prediction with motion alignment for video coding; K. Zhang, et al.; Electronics Letters $11^{th}$ Sep. 2008; vol. 44, No. 19.

Interframe Coding with Variable Block-size Motion Compensation; A. Puri, et al.; IEEE/IEICE Global Telecommunications Conference/1987; Conference Record vol. 1 of 3, pp. 65-69, 1987.

Overlapped Block Motion Compensation; Cheung Auyeung, et al.; P. Maragos, editor, Proc. SPIE vol. 1818, pp. 561-572, Visual Communications and Image Processing '92; Petros Maragos, Ed. vol. 1818 of Presented at the Society of Photo-Optical Instrumentation Engineers (SPIE) Conference; pp. 561-572, Nov. 1992.

Motion- and Aliasing-Compensated Prediction for Hybrid Video Coding; Thomas Wedi, et al.; IEEE Transactions on Circuits and Systems for Video Technology. vol. 13, No. 7, pp. 577-586, Jul. 2003.

The JPEG Still Picture Compression Standard; Gregory K. Wallace, et al.; Consumer Electronics, IEEE Transactions on vol. 38, No. 1, Feb. 1992.

Efficient Image Compression Using Directionlets; Vladan Velisavljevic, et al.; Information, Communications and Signal Processing, 2007 $6^{th}$ International Conference on, pp. 1-5, Dec. 10-13, 2007.

Directionlets: Anisotropic Multidirectional Representation with Separable Filtering; Vladan Velisavlievic, et al.; Image Processing IEEE Transactions on, 15(7), pp. 1916-1933; Jul. 2006.

Orientation Adaptive Subband Coding of Images; David Taubman, et al.; Image Processing; IEEE on; vol. 3, No. 4, pp. 421-437, Jul. 1994.

Prediction of Second-Order Statistics in Motion-Compensated Video Coding; Bo Tao, et al.; Image Processing, 1998; ICIP 98; Proceedings 1998 International Conference on, pp. 910-914 vol. 3, 407 Oct. 1998.

The Lifting Scheme: A Construction of Second Generation Wavelets; Wim Sweldens; Siam J. Math. Anal.; vol. 29, No. 2, pp. 511-546, Mar. 1998.

Rate-Distortion Optimized Motion Compensation for Video Compression Using Fixed or Variable Size Blocks; Gary J. Sullivan, et al.; Global Telecommunications Conference, 1996; Globecom '91. Countdown to the New Millennium.

Coding the Displaced Frame Difference for Video Compression; Krishna Ratakonda, et al.; Image Processing, 1997; Proceedings, International Conference on, 1:353-356 vol. 1, Oct. 26-29, 1997.

Optimum Loop Filter in Hybrid Coders; Khee K. Pang; IEE Circuits and Systems for Video Technology; vol. 4, No. 2, Apr. 1994.

Overlapped Block Motion Compensation: An Estimation-Theoretic Approach; Michael T. Orchard, et al.; IEEE Transactions on Image Processing, vol. 3 No. 5, Sep. 1994.

An Overlapped Block Motion Compensation for High Quality Motion Picture Coding; Satoshi Nogaki, et al.; Cuc Systems Research Laboratories, NEC Corporation; IEEE 1992.

Covariance Analysis of Motion-Compensated Frame Differences; Wolfgang Niehsen, et al.; IEEE Transactions on Circuits and Systems for Video Technology; vol. 9, No. Jun. 1999.

Very Low Bit-Rate Video Coding Based on Matching Pursuits; Ralph Neff, et al.; IEEE Transactions on Circuits and Systems for Video Technology, vol. 7, No. 1, Feb. 1997.

Adaptive Deblocking Filter; Peter List, et al.; IEEE Transactions and Systems for Video Technology, vol. 13, No. 7, Jul. 2003.

Loop-filtering and Post-filtering for Low Bit-rates Moving Picture Coding; Y.L. Lee, et al.; Image Processing, 1999; ICIP 99. Proceedings 1999 International Conference on, 1:94-98 vol. 1, 1999.

Shape-Adaptive DCT with Block-Based DC Separation and ΔDC Correction; Peter Kauff, et al.; IEEE Transactions on Circuits and Systems for Video Technology, vol. 8, No. 3, Jun. 1998.

Extended Analysis of Motion-Compensated Frame; Difference for Block-Based Motion Predictin Error; Ko-Cheung Hui, et al. IEEE Transactions on Image Processing, vol. 16, No. 5, May 2007.

Why B-Pictures Work: A Theory of Multi-Hypothesis Motion-Compensated Prediction; Bernd Girod; Image Processing, 1998; ICIP 98; Proceedings 1998 International Conference on, 2:213-217 vol. 2, Oct. 4-7, 1998.

The Efficiency of Motion-Compensating Prediction for Hybrid Coding of Video Sequences; Bernd Girod; IEEE Journal on Selected Areas in Communications; vol. SAC-5, No. 7, Aug. 1987.

Motion-Compensating Prediction with Fractional-Pel Accuracy; Bernd Girod; IEEE Transactions on Communications, vol. 41, No. 4, Apr. 1993.

Efficiency Analysis of Multihypothesis Motion-Compensated Prediction for Video Coding; Bernd Girod; IEEE Transactions on Image Processing, vol. 9, No. 2, Feb. 2000.

Multihypothesis Motion Estimation for Video Coding; Markus Flierl, et al.; Data Compression Conference, 2001; Proceedings DCC 2001; pp. 341-350; 2001.

A New Bidirectionally Motion-Compensated Orthogonal Transform for Video Coding; Markus Flierl, et al.; pp. 665-668 Proc. IEEE International Conference on Acoustics, Speech, and Signal Processing, Honolulu, HI; Apr. 2007.

Efficient, Robust, and Fast Global Motion Estimation for Video Coding; Frederic Dufaux, et al.; IEEE Transactions on Image Processing, vol. 9, No. 3, Mar. 2000.

The Optimal Transform of Motion-Compensated Frame Difference Images in a Hybrid Coder; Chi-Fa Chen, et al. IEEE Transactions on Circuits and Systems-II: Analog and Digital Signal Processing, vol. 40, No. 6, Jun. 1993.

Variable size block matching motion compensation with applications to video coding; M.H. Chan, PhD, et al.; Communications, Speech and Vision, IEE Proceedings I; 137(4):205-212; Aug. 1990.

Direction-Adaptive Discrete Wavelet Transform for Image Compression; Chuo-Ling Chang, et al.; IEEE Transactions on Image Processing, vol. 16, No. 5, May 2007.

Image Coding Using Wavelet Transform; Marc Antonini, et al.; IEEE Transactions on Image Processing, vol. 1, No. 2, pp. 205-220; Apr. 1992.

Directional Discrete Cosine Transforms for Image Coding; Bing Zeng, et al.; Multimedia and Expo, 2006 IEEE International Conference; pp. 721-724, Jul. 9-12, 2006.

International Search Report and Written Opinion, Patent Cooperation Treaty, PCT/US2010/033953, mailed Dec. 15, 2010, 9 pages.

Kamisli, F. Lim, J.S., Transforms for the motion compensation residual, ICAS SP 2009. IEEE International Confernece on Apr. 19-24, 2009, pp. 789-792.

* cited by examiner

SELECTING TRANSFORM PATHS FOR COMPRESSING VISUAL DATA

BACKGROUND

This description relates to selecting transform paths for compressing visual data.

Compression of visual data is important because raw visual data such as images and video typically require a lot of bits for their representation. Compression allows for storage and transmission of visual data using a smaller number of bits. Compression is achieved by exploiting temporal and/or spatial redundancies in visual media. This may involve predicting an image or video frame based on other compressed or encoded images or frames. The difference between the predicted frame and the actual frame is known as a prediction residual. Prediction residuals are then transformed as part of the compression.

SUMMARY

In one aspect, in general, a method of encoding data includes determining multiple patterns for computing one-dimensional transforms over a first array of data elements. Each pattern includes multiple subsets of data elements of the first array. Each subset that is included in a first pattern has substantially the same number of data elements as each of the other subsets that are included in the first pattern. Each data element of the first array is included in a single one of the subsets included in the first pattern. At least one subset included in the first pattern consists of data elements that are not in a contiguous sequence along a single dimension. The method includes computing, for each pattern of the multiple patterns, multiple one-dimensional transforms over data elements of respective subsets included in the pattern, to provide a set of transform coefficients corresponding to the pattern. The method includes selecting a set of transform coefficients from a group of multiple sets of transform coefficients, the group including the sets of transform coefficients corresponding to respective ones of the multiple patterns. The method includes encoding the selected set of transform coefficients to represent the first array.

Aspects can include one or more of the following features.

Each of the subsets included in each of the multiple patterns includes exactly the same number of data elements as each of the other subsets.

Each of the subsets included in each of the multiple patterns consists of a sequence of contiguous data elements.

The first array comprises a two-dimensional arrangement of the data elements, and at least one of the subsets included in the first pattern comprises a contiguous sequence of data elements that includes a first contiguous section along a first dimension and a second contiguous section along a second dimension.

The second dimension is orthogonal to the first dimension.

The group of multiple sets of transform coefficients consists of the sets of transform coefficients corresponding to respective ones of the multiple patterns.

Encoding the selected set of transform coefficients to represent the first array includes encoding information indicating which of the multiple patterns corresponds to the selected set of transform coefficients.

The group of multiple sets of transform coefficients includes at least one set of transform coefficients based on a two-dimensional transform computed over the data elements of the first array.

Encoding the selected set of transform coefficients to represent the first array includes encoding one or more parameters identifying at least one transform used to generate the selected set of transform coefficients.

The one or more parameters include a parameter that identifies a member of a group that includes multiple sets of one-dimensional transforms and one or more two-dimensional transforms.

The one or more parameters include a parameter that identifies at least one transform by identifying one of the multiple patterns.

The one or more parameters include a parameter that indicates whether the first array was transformed using a two-dimensional transform or using multiple one-dimensional transforms.

A set of transform coefficients is selected from the group of multiple sets of transform coefficients based at least in part on which set of transform coefficients is encoded to represent the first array with a maximum compression.

The selected set of transform coefficients is encoded to represent the first array based at least in part on run-length encoding.

Each set of transform coefficients in the group of multiple sets of transform coefficients is computed based on at least one transform from a group of multiple transforms.

The first array of data elements is associated with a video frame.

The first array of data elements corresponds to a block of pixels of the video frame.

The first array of data elements is associated with a residual computed from two video frames.

The residual is obtained by subtracting pixel values of one of the frames from corresponding pixel values in the other of the frames.

In another aspect, in general, a computer-readable storage medium stores a computer program for encoding data. The computer program comprises instructions for causing a computer system to determine multiple patterns for computing one-dimensional transforms over a first array of data elements. Each pattern includes multiple subsets of data elements of the first array. Each subset that is included in a first pattern has substantially the same number of data elements as each of the other subsets that are included in the first pattern. Each data element of the first array is included in a single one of the subsets included in the first pattern. At least one subset included in the first pattern consists of data elements that are not in a contiguous sequence along a single dimension. The computer program also comprises instructions for causing the computer system to: compute, for each pattern of the multiple patterns, multiple one-dimensional transforms over data elements of respective subsets included in the pattern, to provide a set of transform coefficients corresponding to the pattern; select a set of transform coefficients from a group of multiple sets of transform coefficients, the group including the sets of transform coefficients corresponding to respective ones of the multiple patterns; and encode the selected set of transform coefficients to represent the first array.

In another aspect, in general, a method of decoding data includes receiving a first parameter indicating a selected pattern of multiple patterns for computing one-dimensional transforms over a first array of data elements. Each pattern includes multiple subsets of data elements of the first array. Each subset that is included in a first pattern has substantially the same number of data elements as each of the other subsets that are included in the first pattern. Each data element of the first array is included in a single one of the subsets included in the first pattern. At least one subset included in the first pattern consists of data elements that are not in a contiguous sequence along a single dimension. The method includes receiving encoded transform coefficients representing the first array and one or more parameters related to the transform coefficients, the one or more parameters including the first parameter. The method includes computing one or more inverse transforms on the transform coefficients to generate the first array of data elements based on the selected pattern.

Each of the subsets included in each of the multiple patterns includes exactly the same number of data elements as each of the other subsets.

Each of the subsets included in each of the multiple patterns consists of a sequence of contiguous data elements.

The first array comprises a two-dimensional arrangement of the data elements, and at least one of the subsets included in the first pattern comprises a contiguous sequence of data elements that includes a first contiguous section along a first dimension and a second contiguous section along a second dimension.

The second dimension is orthogonal to the first dimension.

The one or more parameters identify at least one transform used to generate the transform coefficients.

The one or more parameters include a parameter that identifies a member of a group that includes multiple sets of one-dimensional transforms and one or more two-dimensional transforms.

The one or more parameters include a parameter that indicates whether the first array was transformed using a two-dimensional transform or using multiple one-dimensional transforms.

The encoded transform coefficients are decoded into the transform coefficients based at least in part on run-length decoding.

The first array of data elements is associated with a video frame.

The first array of data elements corresponds to a block of pixels of the video frame.

The first array of data elements is associated with a residual computed from two video frames.

The residual is obtained by subtracting pixel values of one of the frames from corresponding pixel values in the other of the frames.

In another aspect, in general, a computer-readable medium stores a computer program for decoding data. The computer program comprises instructions for causing a computer system to receive a first parameter indicating a selected pattern of multiple patterns for computing one-dimensional transforms over a first array of data elements. Each pattern includes multiple subsets of data elements of the first array. Each subset that is included in a first pattern has substantially the same number of data elements as each of the other subsets that are included in the first pattern. Each data element of the first array is included in a single one of the subsets included in the first pattern. At least one subset included in the first pattern consists of data elements that are not in a contiguous sequence along a single dimension. The computer program also comprises instructions for causing the computer system to: receive encoded transform coefficients representing the first array and one or more parameters related to the transform coefficients, the one or more parameters including the first parameter; and compute one or more inverse transforms on the transform coefficients to generate the first array of data elements based on the selected pattern.

In another aspect, in general, a system comprises a transmitter configured to determine multiple patterns for computing one-dimensional transforms over a first array of data elements. Each pattern includes multiple subsets of data elements of the first array. Each subset that is included in a first pattern has substantially the same number of data elements as each of the other subsets that are included in the first pattern. Each data element of the first array is included in a single one of the subsets included in the first pattern. At least one subset included in the first pattern consists of data elements that are not in a contiguous sequence along a single dimension. The transmitter is also configured to: compute, for each pattern of the multiple patterns, multiple one-dimensional transforms over data elements of respective subsets included in the pattern, to provide a set of transform coefficients corresponding to the pattern; select a set of transform coefficients from a group of multiple sets of transform coefficients, the group including the sets of transform coefficients corresponding to respective ones of the multiple patterns; and encode the selected set of transform coefficients to represent the first array. The system also comprises one or more receivers, each receiver configured to: receive encoded transform coefficients and one or more parameters related to the transform coefficients from the transmitter; and compute one or more inverse transforms on the transform coefficients to generate the first array of data elements based on the pattern corresponding to the selected set of transform coefficients indicated by at least one of the parameters related to the transform coefficients.

Among the many advantages of the invention (some of which may be achieved only in some of its various aspects and implementations) are the following.

When an array of data is encoded, the efficiency that may be achieved depends on various characteristics of the transform process. A set of coefficients for encoding a given array may be selected by comparing a group of multiple candidate sets of coefficients and determining which of the candidate sets of coefficients represents the array with the best compression efficiency. The set of coefficients selected may result from a single 2-D transform, or from multiple 1-D transforms, for example. The multiple 1-D transforms can be arranged over the array according to different possible candidate patterns. In some implementations, the candidate patterns over which the transforms are performed are selected to have certain characteristics that may yield better performance. For example, it may be advantageous to arrange the paths over which the 1-D transforms are computed to have substantially the same number of data elements so that subsequent encoding (e.g., run-length encoding) can be performed more efficiently. For example, using the same number of data elements may enable the computational algorithm that is used for each of the 1-D transforms to use the same operations (including the same number of operations), which may simplify the implementation. Additionally, if the resulting 1-D vectors of transform coefficients have the same size, corresponding coefficients in the 1-D transform vectors correspond to the same spatial frequency component. As a result, the transform coefficients can be grouped more easily and efficiently for run-length encoding, as described in more detail below.

Other features and advantages of the invention will become apparent from the following description, and from the claims.

DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Figure 1:
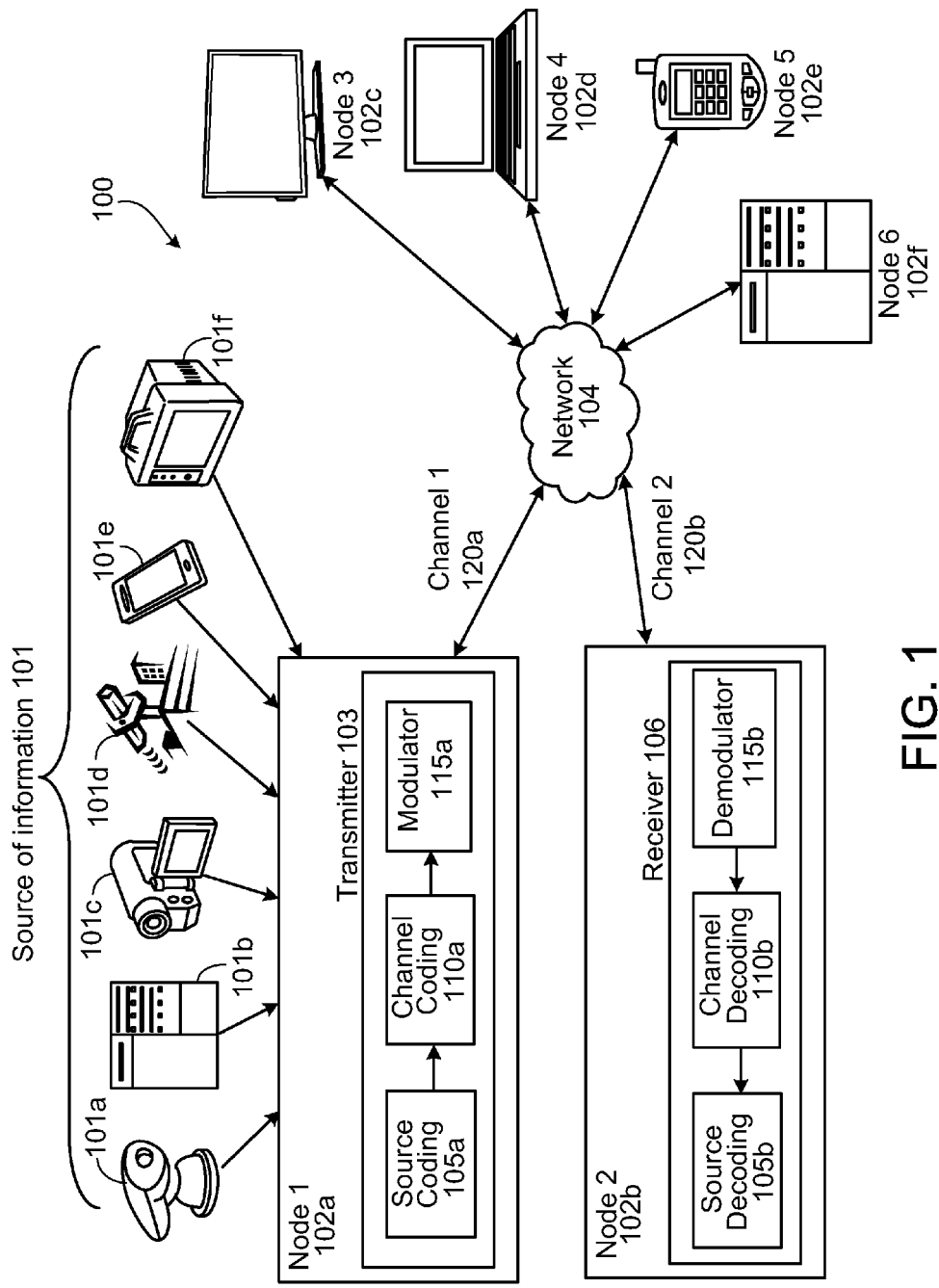
FIG. 1 is an example of a video communication system.

FIG. 1 shows an example of a system 100 for communicating data over a network. In broad overview, the system 100 includes one or more nodes 102a-102f (102 in general) connected over a network 104. The nodes 102 may transmit and/or receive data from other nodes in the network 104. In some implementations, the data includes visual data such as images or video. The data may come from one or more sources 101 of data such as a webcam 101a, a video or still camera 101c, a surveillance camera 101d or a wireless handheld gadget 101e such as a phone or a personal digital assistant (PDA). In some implementations, the data may be contained in a file stored electronically in a server 101b, or any other computing device. In some implementations, the source 101 may be a medical device 101f that may transmit visual or other forms of data to a remote location. The source 101 may also include, for example, any sensor, detector, recorder, or analyzer that can detect, derive, capture, store or record visual data such as video or images. In some implementations, a source 101 may combine multiple sources including, but not limited to, the sources described above. The source 101 may reside in any facility, location or vehicle. For example, the source 101 may be a security camera deployed in a building or campus. In another implementation, the source 101 may be carried around by a user. In some implementations, the source 101 may be an imager or detection devices on a satellite. In other implementations, the source 101 may be deployed on a vehicle such as aircrafts, ships or other manned or unmanned vehicles. The source 101 may communicate with a node 102 that is connected to the network 104. In some implementations, the source 101 may be a part of the node 102. In other implementations, the source 101 may communicate with the node 102 via one or more networks and/or one or more intervening devices. Any hardware or software may be used to facilitate communication between the source 101 and the node 102.

The node 102 may be configured to receive data from the source 101 as input data, process the data (e.g., using a compression or decompression process), and provide output data. The node 102 may be a device capable of decompressing compressed input data and presenting the resulting output data including displaying or rendering images and/or video. For example, the node 102 could be a television or display device 102c. The node could be a desktop or laptop computer 102d. The node could also be a wireless device 102e such as a PDA or a mobile phone that is capable of receiving, storing or displaying images and video. The node 102 may be a device capable of compressing uncompressed input data and transmitting the resulting compressed output data over the network 104, such as a server 102f, or a storage device for storing the compressed data. Such a server or storage device may be optionally connected to a device capable of retrieving and displaying visual information.

In some implementations, a node 102a (node 1 in FIG. 1) includes a transmitter 103. The transmitter 103 may be configured to encode data from the source 101 and transmit encoded data over the network 104. In some implementations, the transmitter 103 may include components for source coding 105a and channel coding 110a. The transmitter 103 may also include a modulator 115a. The transmitter may also include one or more components or devices for converting data from the source 101 into a format suitable for source coding.

Source coding 105a may also be referred to as a data compression technique. Source coding may involve encoding schemes engineered to reduce the number of bits required for representing a given image, video or other types of information. Source coding 105a may include some steps that are lossless (e.g., application of transforms, or Arithmetic coding), and some steps that are lossy (e.g., quantization, or thresholding). Examples of transforms that can be applied are mathematical transforms such as discrete cosine transform (DCT), discrete sine transform (DST), discrete wavelet transform (DWT), fractal compression, and discrete Fourier transform (DFT). In some implementations, the source coding 105a includes determining one or more patterns for arranging subsets of data elements (e.g., pixels of a frame or elements of a prediction residual) over which transforms are to be computed. In some cases, greater compression may be achieved for certain encoding steps (e.g., run-length encoding of non-zero quantized transform coefficients) when the patterns have certain characteristics, as described in more detail below.

Channel coding 110a refers to addition of redundant bits of information to be included in the data transmitted across a channel. Channel coding may facilitate error detection and/or error correction at a receiver end and increases the reliability of a transmission. Channel codes may also be referred to as error correction codes. Channel coding 110a may include the use of codes such as block codes, convolutional codes, turbo codes and low density parity check (LDPC) codes.

The transmitter may include a modulator 115a. A modulator 115a may modulate an analog carrier in accordance with a stream of digital bits. The modulator may use any digital modulation techniques including, for example, phase shift keying (PSK), frequency shift keying (FSK), amplitude shift keying (ASK), quadrature amplitude modulation (QAM), pulse position modulation (PPM), on-off keying (OOK), minimum shift keying (MSK), continuous phase modulation (CPM), Trellis coded modulation (TCM), and orthogonal frequency division multiplexing (OFDM).

In some implementations, a node 102b (node 2 in FIG. 1) includes a receiver 106 that is configured to receive information from another node 102 on the network. Even though FIG. 1 shows the transmitter 103 and receiver 106 to be on different nodes, it should be appreciated that any node 102 may have one or more transmitters and/or one or more receivers. Also, the transmitter 103 and/or the receiver 106 may be a part of any node 102. The receiver 106 may include one or more of a demodulator 115b, a channel decoder 110b and a source decoder 105b. The demodulator 115b typically does an inverse operation to that of the modulator 115a to recover digital bits from a received modulated analog signal. Similarly, the channel decoder 110b and source decoder 105b typically perform inverse operations to that performed by the channel coder 110a and source coder 105a, respectively. In some implementations, the receiver 106 may be connected to a display for rendering the received video or image data. Any software and additional hardware may be used for such rendering. The receiver 106 may be connected to a storage medium to store the received digital data.

The nodes 102 may be connected via a network 104. Although FIG. 1 shows only one network 104 connecting the nodes, there may be a plurality of such networks interconnected with each other. The networks can be the same type of network or different types of networks. The network 104 can be a local-area network (LAN), such as a company Intranet, a metropolitan area network (MAN), or a wide area network (WAN), such as the Internet or the World Wide Web. In one implementation, the network 104 may include one or more of a private network and a public network.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some implementations, the network 104 may comprise a wireless link, such as an infrared channel or satellite band. The topology of the network 104 may be a bus, star, or ring network topology. The network may include any number of repeaters, appliances, devices, servers, storage media and queues.

The network 104 supports one or more channels 120 between nodes connected to the network. For example the nodes 102a and 102b may be connected by a channel. In some implementations, the channel 120 may include two or more different channels, such as channel 120a and channel 120b. The channels 120a and 120b may have substantially same or different channel characteristics. In some implementations, some of the channel characteristics of the channels 120a and 120b may be the same while some other channel characteristics may be different. In general, a channel may be defined as properties of at least a part of a medium over which two nodes communicate with each other.

Figure 2:
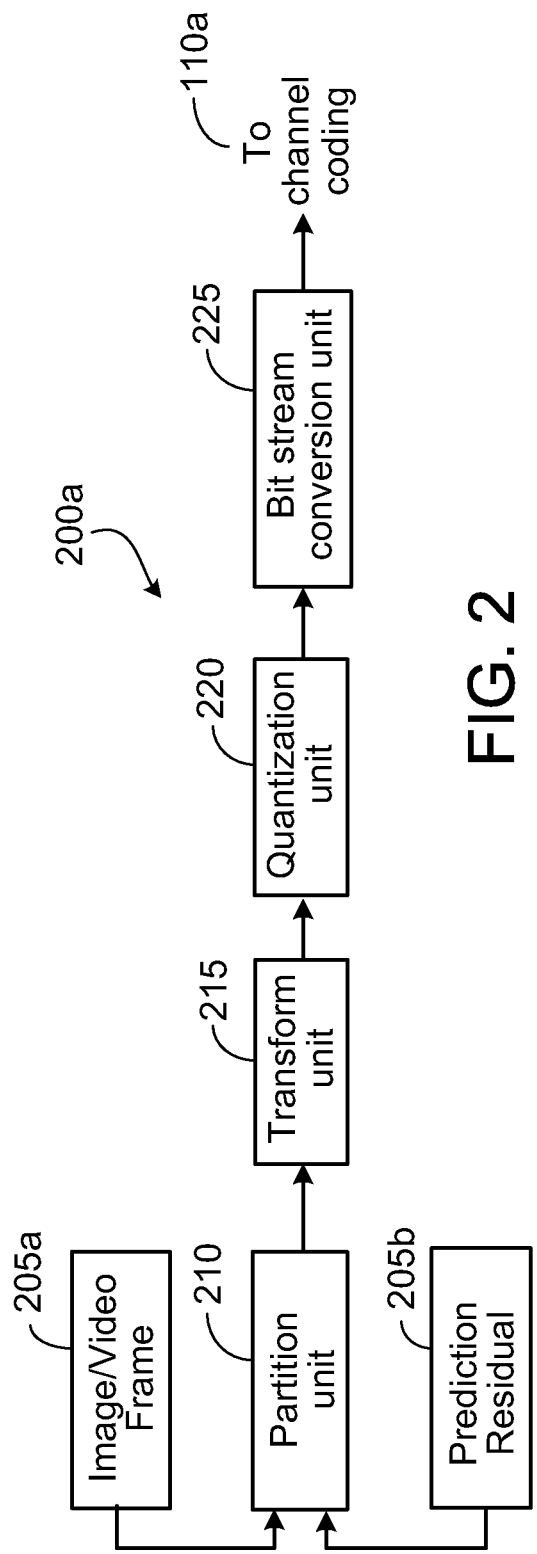
FIG. 2 is a block diagram of an exemplary source coding system.

Referring now to FIG. 2, a block diagram of an exemplary system 200a for implementing the source coding 105a is shown and described. The system 200a includes a partition unit 210 that partitions or divides a data array (e.g., an image, frame, or prediction residual, as described in more detail below) into multiple subparts, which are themselves arrays of data called blocks. In some implementations, the blocks are square arrays of pixels, where each pixel value can be encoded in any of a variety of formats. The system 200a also includes a transform unit 215 that transforms data from one domain to another. The system 200a includes a quantization unit 220 that converts image pixel data or transform coefficients into quantized numbers. In some implementations, the system 200a includes a bit stream conversion unit 225 that converts the quantized numbers to a coded stream of bits.

The data array (205 in general) may be of different types and forms. In some cases, the data array 205 is an image 205a (e.g., either an individual image or an image that is a video frame of a video stream having multiple frames). In some cases, the data array 205 is a prediction residual 205b related to a video frame. In some cases, some of the data arrays 205 are video frame images while other data arrays 205 are prediction residuals. In some cases, a data array 205 includes some portions that encode portions of a video frame image directly and other portions that encode prediction residuals for portions of the video frame image. In such cases, whether a portion of the video frame image is encoded directly or as a prediction residual can be determined based on which can be more efficiently compressed by the transform unit 215, as described in more detail below. The data arrays 205 in the following examples are two-dimensional arrays. Alternatively, similar techniques can be applied to arrays of different dimensions.

The data array 205 is partitioned into subparts via the partition unit 210. The partition unit 210 may partition a data array 205 in a variety of ways. For example, the partition unit may divide a data array 205 into multiple two-dimensional arrays. In some implementations, where the data array 205 has a dimension of three or higher, the partition unit 210 may divide the data array 205 into multiple partitions having lower dimensions. For example, a three dimensional data array 205 may be divided into multiple two-dimensional slices. A three-dimensional array may also be divided into smaller three-dimensional blocks. The partition unit 210 may divide the data in a homogenous or non-homogenous fashion. For example, part of a two-dimensional array 205 (such as an image/video frame 205a or residual frame 205b) may be partitioned into smaller two-dimensional blocks whereas another part of the two-dimensional array 205 may be partitioned into larger two-dimensional blocks. In some implementations, the partition unit may introduce one or more identifying parameters corresponding to each partition such that the original data array may be reconstructed from the partitions. In some implementations, the partition unit 210 may pass on the data array 205 without dividing it into any subparts. Whether or not the partition unit 210 divides the data array into subparts, may be governed by one or more parameters or a nature of the data array.

The transform unit 215 selectively transforms an array (e.g., a partitioned block or an entire data array 205) from one domain to another. For example, the transform unit 215 transforms data from a spatial domain to a frequency domain. Transforms computed by the transform unit 215 may include, for example, one or more of discrete cosine transform (DCT), discrete sine transform (DST), discrete wavelet transform (DWT), fractal compression, and discrete Fourier transform (DFT). The system 200a determines whether or not a transform is to be performed on the array, for example, based on a predetermined metric applied to pixels of the array, such as whether or not the result of the transform operation would represent the array using fewer non-zero coefficients than there are non-zero pixels in the received array. The transform unit 215 may compute any combination of one-dimensional, two-dimensional, or higher-dimensional transform.

The transform unit 215 may be used to compress different types of data arrays. In some cases, the pixels representing image intensities are transformed. In other cases, pixels representing prediction residuals are transformed. Examples of prediction residuals include the motion-compensation-residual (MC-residual), the resolution-enhancement-residual (RE-residual) which is often used in scalable video coding, the disparity-compensation-residual (DC-residual) often used in multiview coding, and intra prediction residual often used in H.264/AVC. Typically, transforms used to compress images may also be used to compress prediction residuals. For example, the Discrete Cosine Transform (DCT) may be used to compress images and MC-residuals. Another example of such transforms is the Discrete Wavelet Transform (DWT), which may be used to compress images as well as residual frames.

The choice of which type of transform(s) will be used by the transform unit 215 to represent an array of data (or whether or not to use any transform) may be governed by comparing results of performing various transforms (e.g., including 1-D, or 2-D transforms) over different possible candidate patterns over the array. In some implementations, the candidate patterns over which the transforms are performed are selected to have certain characteristics that may yield better performance for some arrays. For example, if an array is to be partitioned into subsets of elements over which 1-D transforms are performed, it may be beneficial to ensure that each subset includes approximately the same number of elements (e.g., within 10%). This characteristic may yield transform coefficients that are clustered in such a way that run-length encoding of the coefficients can be efficiently performed, as described in more detail below.

In some implementations, the transform unit 215 may pass an incoming signal without transformation. For example, if the transform unit 215 includes a digital filter with a delta function impulse response, the incoming signals will be passed through the unit 215 substantially unchanged. The transform unit 215 can be configured to apply a transform or pass a signal without transformation selectively for a given block.

In some implementations, a quantization unit 220 may be used to represent a range of values using a single representative value. For example, values of transform coefficients may be of continuous nature and the quantization unit 220 may represent such coefficients using a limited number of discrete values. The quantization unit 220 may perform operations such as round, ceiling, floor, modulo and threshold. The quantization unit 220 may represent the transform coefficients in a variety of ways. For example, in some implementations, the quantization unit 220 represents a transform coefficient as the next highest or lowest integer. In other implementations, the quantization unit 220 may represent a coefficient up to two decimal places. The quantization unit 220 may use different methods to quantize different coefficients. For example, consider a one-dimensional array of coefficients: [58 −51 −15 −12]. A corresponding quantization array may be defined as: [24 40 51 61], for which the quantized values will be: [2 −1 0 0], the operation being dividing each element of the coefficient array by the corresponding value in the quantization array and then rounding to the nearest integer. In other implementations, a homogenous quantization may also be used where each coefficient is quantized in substantially the same way.

The bit stream conversion unit 225 converts numbers to streams of bits. The bit stream conversion unit 225 may select, from a quantized array, only those numbers that are non-zero for conversion (e.g., using run-length encoding). Typically, the numbers will be converted to binary representations. Bits may be physically represented in various ways such as different levels of voltage, current, or a presence or absence of a signal. The bit streams coming out of the bit stream conversion unit may represent the source coded form of the input data array 205. In some implementations, these bit streams are used as input to channel coding units 110a. The bit stream conversion unit 225 may include hardware and/or software for implementing coding schemes such as Huffman coding, variable length coding or other cryptographic coding schemes.

The partition unit 210, the transform unit 215, the quantization unit 220 and the bit stream conversion unit 225 may be implemented using any of a variety of particular hardware modules. For example any of these units may be implemented using one or more of a microprocessor, a microcontroller, and a digital signal processors (DSP). Implementations may include hardware circuits such as sample and hold circuits, adders, multipliers, shift registers, logic gates, transistors, flip flops, switches, capacitors, resistors, inductors, buses, cache memories, timing circuits and diodes. A variety of types of algorithms and/or software running on one or more programmed processors may be used in computing the transforms, quantization, partitioning or conversion to bit streams.

Figure 3:
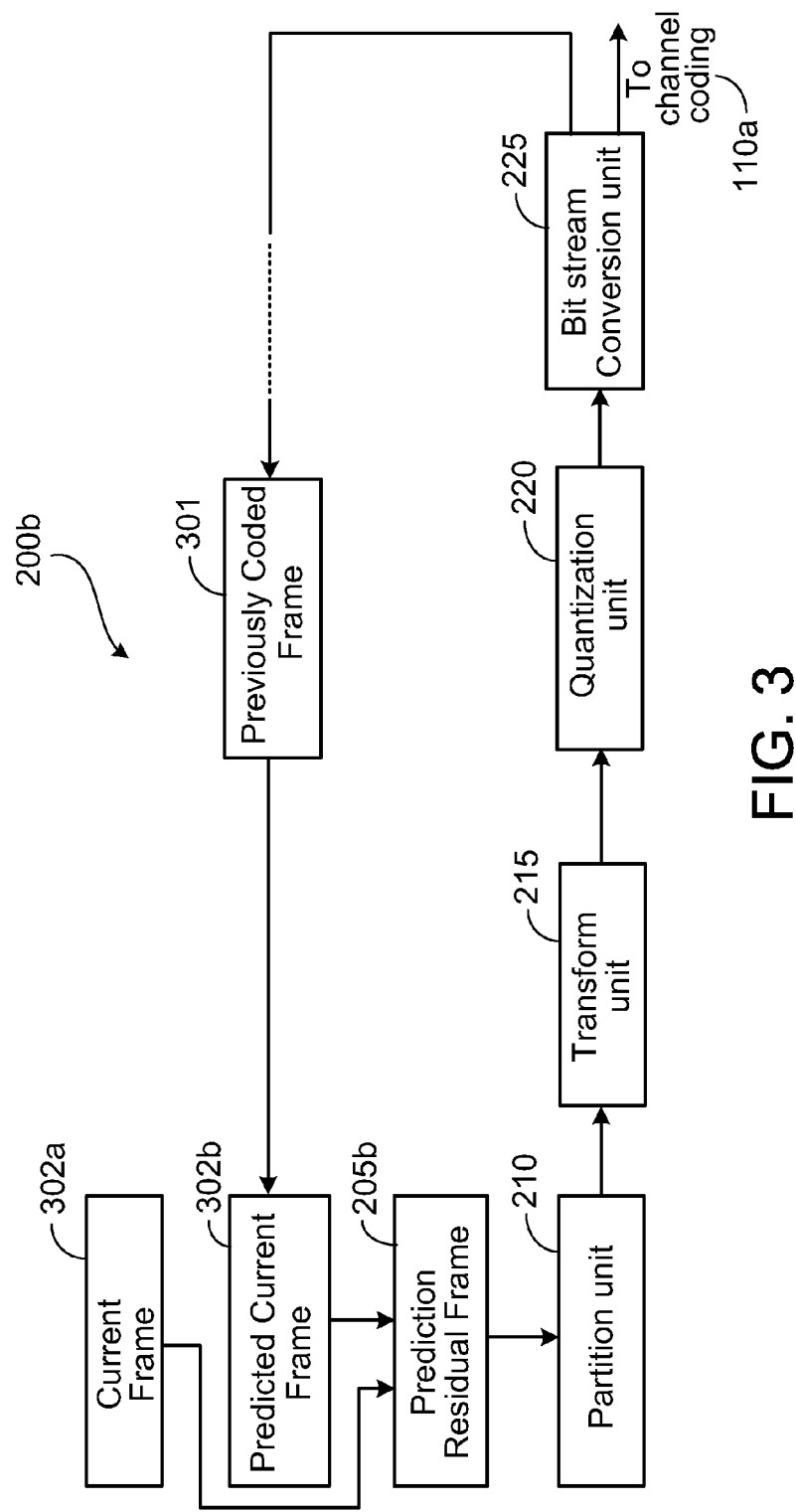
FIG. 3 is a block diagram of an exemplary source coding system used for coding video frames.

Referring now to FIG. 3, another example of a system 200b for source coding of video frames is shown and described. In some implementations, the system 200b obtains the prediction residual frame 205b from a current frame 302a and a predicted version 302b of the current frame. The predicted current frame 302b may be obtained from one or more previously coded frames 301. In one implementation, the predicted current frame 302b is obtained from a single previously coded frame. In another implementation, the predicted current frame 302b is obtained from multiple previously coded frames. In some implementations, one or more future frames (with respect to frame presentation times) may also be used to obtain the predicted current frame 302b. In other words, any combination of forward and backward predictions may be used to obtain the predicted current frame.

In some implementations, the predicted current frame 302b is obtained using transform coefficients related to at least one previously coded frame 301. In other implementations, the predicted current frame 302b is obtained using intensity values from at least one previously coded frame 301. The previously coded frame(s) 301 may be retrieved from a buffer or may be reconstructed from related transform coefficients. In some implementations, obtaining the predicted current frame 302b may involve operations such as linear prediction, non-linear prediction and interpolation, and may involve estimating and using motion vectors. In some implementations, the predicted current frame 302b is computed using existing correlation between adjacent frames in a video stream.

The predicted current frame 302b may be compared to a current frame 302a to obtain the prediction residual frame 205b. In some implementations, differences in values of intensity of corresponding pixels in the current frame 302a and the predicted current frame 302b are calculated to obtain the prediction residual frame 205b. In other words, the prediction residual frame 205b represents a difference image between the current frame 302a and the predicted current frame 302b. Other operations between the current frame 302a and the predicted current frame 302b may alternatively be performed to obtain the prediction residual frame 205b. For example, in some implementations, differences between transform coefficients of the current frame 302a and the predicted current frame 302b are computed in order to obtain the prediction residual frame 205b. The prediction residual frame may be passed through one or more of the partition unit 210, transform unit 215, quantization unit 220 and bit stream conversion unit 225 which have been described with respect to FIG. 2.

Figure 4:
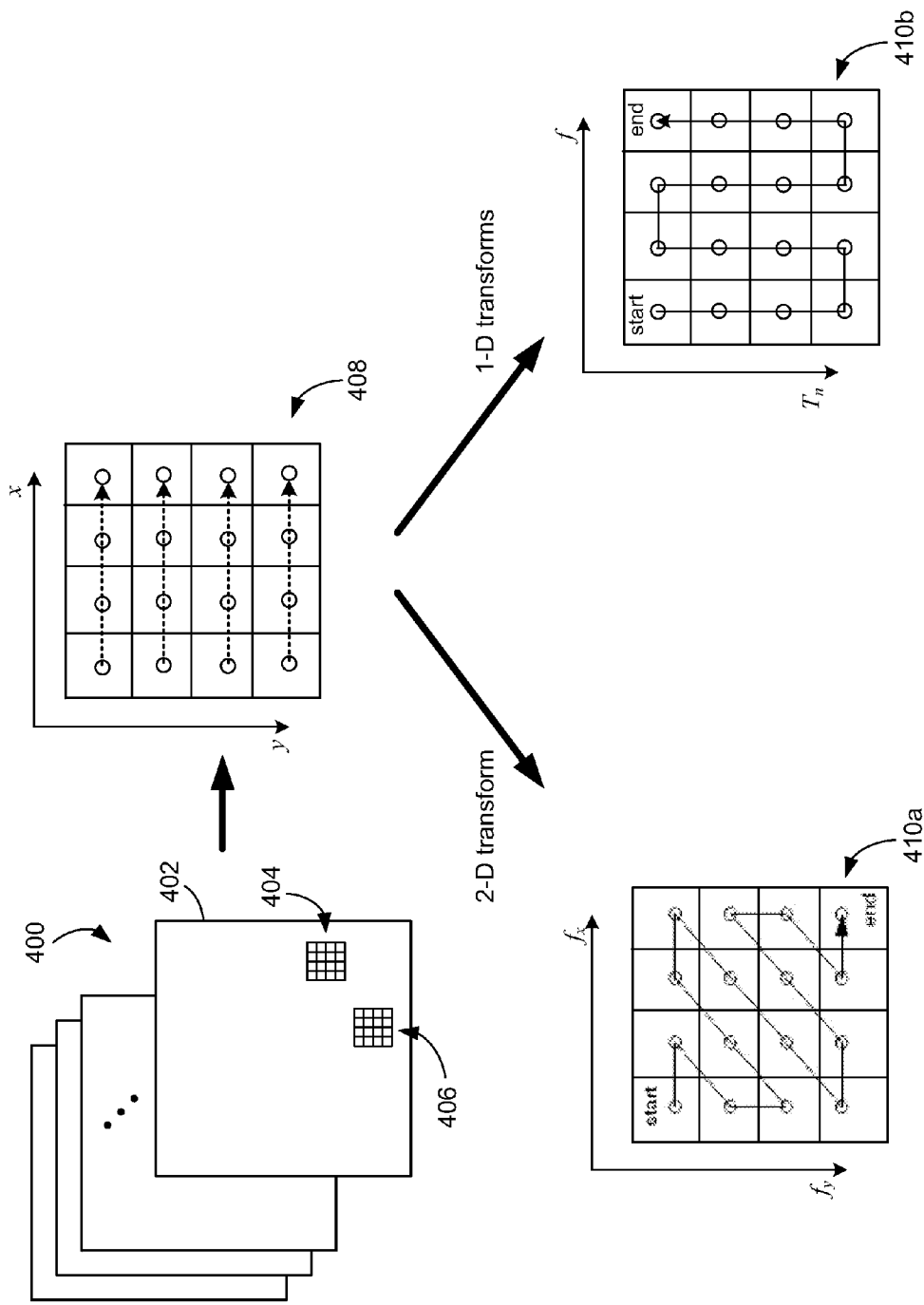
FIG. 4 is a schematic diagram of an exemplary encoding procedure.

FIG. 4 shows a schematic diagram of an exemplary encoding procedure performed by an encoding system (e.g., system 200a or 200b) that uses a coefficient selection procedure based on multiple possible transform patterns. A sequence of frames 400 is to be encoded. In some frames, such as frame 402, blocks of pixels are encoded based on similar reference blocks. For example, a current block 404 may be encoded with respect to a reference block 406. In this example, the reference block 406 is in the same frame 402 as the current block 404, however, in other examples, the reference block may be in a different frame from the frame 402 containing the current clock 404.

The array 408 of data elements to be encoded may be a prediction residual block that is generated by computing differences between pixel values in the current block 404 and respective pixel values in the reference block 406. Such a prediction residual block has the same spatial dimensions (along the x and y axes) as the current and reference blocks. In this example, these blocks are 4×4 blocks. Other block sizes may be used, but the sizes of the current and reference blocks are generally the same (i.e., they include the same total number of pixels and have the same number of pixels along the x and y dimensions). Alternatively, the array 408 of data elements to be encoded may be the current block 404 itself.

The encoding system performs one or more transform operations on the array 408 to generate a set of transform coefficients to represent the information in the array 408. In some implementations, multiple sets of transform coefficients are generated and compared to select the set of transform coefficients that are to be used to further encode the array 408. For example, different sets of coefficients are computed using different transforms from a group of pre-determined transforms to allow the transform with the greatest ability to compress the array 408 to be used. Some of the sets of transform coefficients can be computed based on a 2-D transform performed over the entire array 408. Some of the sets of transform coefficients can be computed based on multiple 1-D transforms each computed over a different portion of the array 408, and together covering the entire array 408. The 1-D transforms can be arranged according to different respective patterns. Such 1-D transforms may exhibit the highest compression for features of a frame or prediction residual that includes 1-D features, for example.

FIG. 4 shows a first example of a set of coefficients 410a that are computed based on a single 2-D transform performed on the array 408. The transform domain in this example has dimensions $f_x$ and $f_y$. The transform coefficients 410a represent points along the dimensions $f_x$ and $f_y$ corresponding to different weights of corresponding 2-D "basis patterns," and the $f_x$ and $f_y$ positions of those weights can be interpreted as spatial frequencies associated with those 2-D basis patterns. The values of the transform coefficients 410a may be quantized (such that the values are rounded to the closest step size of a set of quantization step sizes). The encoding system arranges the values in the set of transform coefficients 410a in a particular one-dimensional ordering according to a predetermined scanning pattern over the two dimensions of the 4×4 array of transform coefficients 410a. FIG. 4 shows an exemplary zig-zag scanning order that can be used to generate a series of 16 coefficient values x[0], . . . , x[15]. Thus, the position index i of a given coefficient value x[i] within the array of transform coefficients represents a position in a one-dimensional ordering of the coefficients 410a.

FIG. 4 also shows a second example of a set of coefficients 410b that are computed based on multiple 1-D transforms performed on each of multiple subsets of data elements of the array 408, arranged in an exemplary pattern. In this example, a uniform horizontal pattern is used, with each subset corresponding to a row of four elements along the x dimension, as shown by the dotted lines over the array 408 in FIG. 4. The four 1-D transforms performed on these rows of four data elements, respectively, yields four transform vectors $T_1$, $T_2$, $T_3$, $T_4$, each having four transform coefficients. The transform domain in this example has dimensions f and $T_n$. The transform coefficients of each transform vector represent points along the dimension f corresponding to different weights of corresponding 1-D basis patterns, and the f positions of those weights can be interpreted as spatial frequencies associated with those 1-D basis patterns. The other dimension $T_n$ corresponds to different transform vectors. The values of the transform coefficients 410b may also be quantized. The encoding system arranges the values in the set of transform coefficients 410b in a particular one-dimensional ordering according to a predetermined scanning pattern over the two dimensions of the 4×4 array of transform coefficients 410b. FIG. 4 also shows an exemplary back-and-forth scanning order that can be used to generate a series of 16 coefficient values x[0], . . . , x[15] for the coefficients 410b. In this exemplary scanning order, the four lowest frequency transform coefficients occur first, followed by the next lowest frequency transform coefficients, and so on until the highest frequency transform coefficients. This order may be helpful in some cases, for example, if the high frequency transform coefficients are more likely to be zero, since a run-length encoding may be able to stop sooner leaving a longer run of zeros at the end resulting in a more efficient encoding. Other examples of patterns for computing 1-D transforms over an array of data elements are described below (with reference to FIGS. 6A and 6B), and other examples of scanning orders (or "scanning patterns") are described below (with reference to FIG. 7).

Figure 5A:
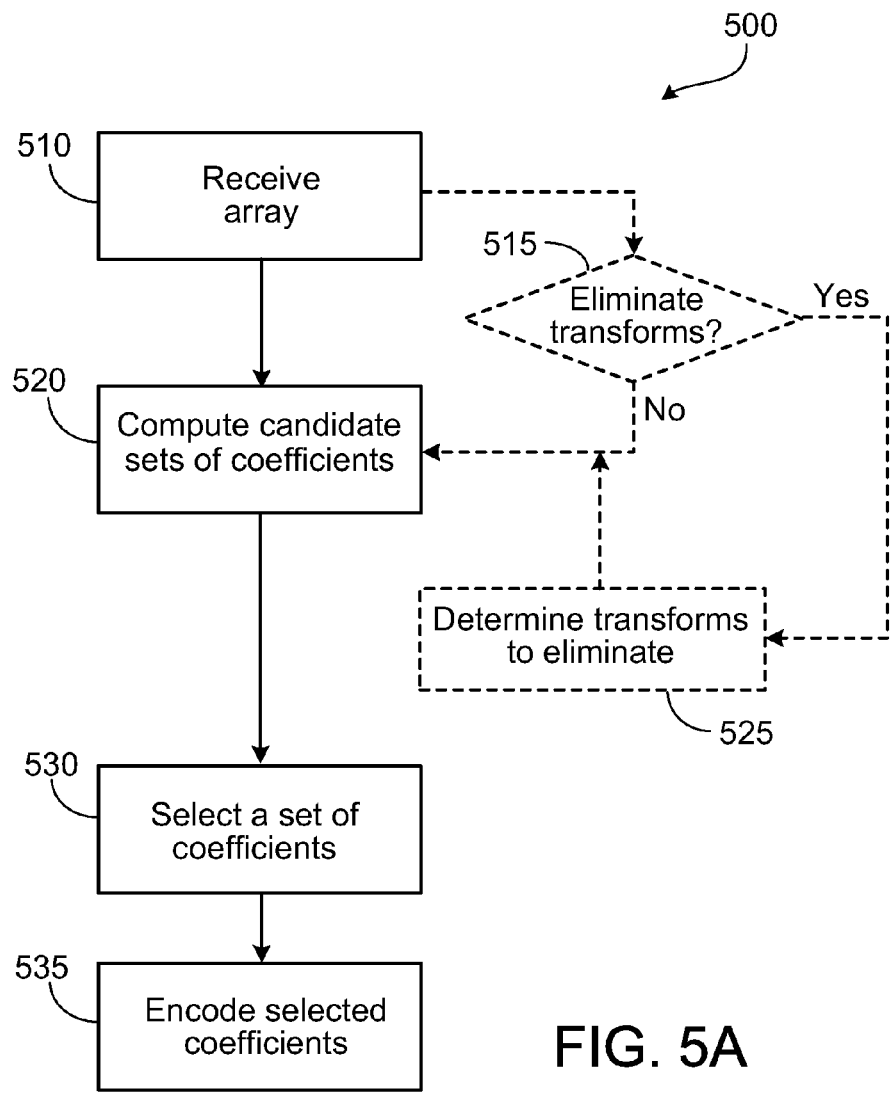
FIG. 5A is a flowchart depicting a particular order of operations in an encoding procedure.

Referring now to FIG. 5A, a flowchart 500 represents an exemplary arrangement of operations performed in an encoding system (e.g., by the transform unit 215). The operations can be performed on each of multiple arrays corresponding to different blocks of a frame or prediction residual, for example. The operations select a set of coefficients for encoding a given array by comparing a group of multiple sets of coefficients and determining which of the sets of coefficients represents the array with a maximum compression (e.g., according to a given measure of compression efficiency). In this example, the operations include receiving 510 an array from a source or from a module of the system (e.g., a module that divides an image, frame, or prediction residual into subparts as described above). Operations also include computing 520 multiple candidate sets of transform coefficients. Operations also include selecting 530 a set of transform coefficients from the group of candidate sets of transform coefficients that provides the greatest compression, and encoding 535 the selected coefficients.

Operations may optionally include determining 515 whether to attempt to eliminate any transforms from the group of pre-determined transforms (e.g., to decrease processing delay). In some cases, if the group of pre-determined transforms is large, it may be desirable to eliminate some of the transforms that are unlikely to provide high compression of a given array. That way, the processing time that would otherwise be needed to compute candidate transform coefficients based on those transforms can be avoided. If transforms are to be considered for elimination from the group of pre-determined transforms, the operations include determining 525 which, if any, of the transforms will be eliminated from consideration for computing any of the candidate sets of coefficients based on estimated characteristics of a given array and how a given transform would be likely to perform on an array with those characteristics. The time used to determine which transforms to eliminate should be less than the time it would have taken to compute the corresponding transform coefficients.

Other operations can be performed to encode the set of transform coefficients chosen to represent the array. For example, encoding the selected set of transform can include encoding information indicating which of the multiple patterns of a pattern set was used to compute the selected set of transform coefficients.

Figure 5B:
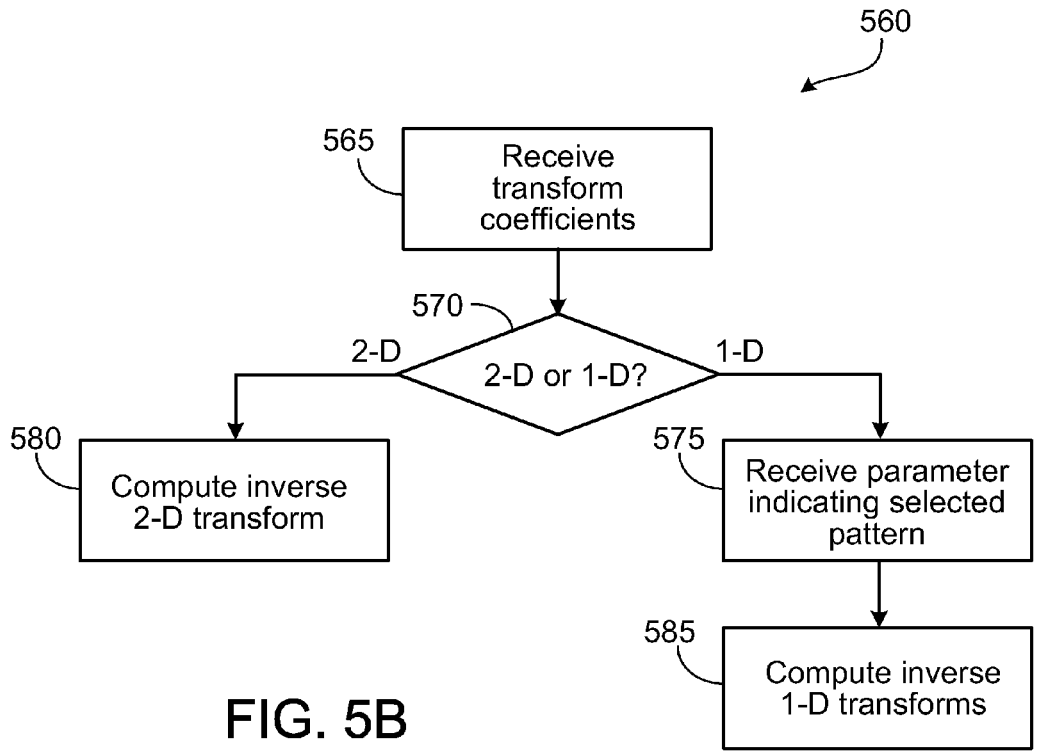
FIGS. 5B and 5C are flowcharts depicting a particular order of operations in a decoding procedure.

Referring now to FIG. 5B, a flowchart 560 represents an exemplary arrangement of operations performed in a decoding system for decoding encoded data received by the decoding system. The operations can be performed to recover arrays corresponding to different blocks of a frame or prediction residual, for example, from a set of transform coefficients encoded within a received data stream. The operations include receiving (565) encoded transform coefficients representing the array and one or more parameters related to the transform coefficients. Initial decoding may be performed to recover the transform coefficients by decoding some of the last encoding steps performed by the encoding system (e.g., run-length encoding). Operations may also include determining (570) whether the array was transformed by the encoding system using a 2-D transform or multiple 1-D transforms. If multiple 1-D transforms were used, the operations include receiving (575) one of the parameters that indicates a selected pattern of multiple candidate patterns for computing the 1-D transforms over the array of data elements. For example, if the multiple patterns used by the encoding system are the 12 patterns of the example shown in FIG. 6A, the parameter can be a number from 1 to 12 corresponding to the pattern that was selected for performing the 1-D transforms. The operations also include computing (580) an inverse 2-D transform, or computing (585) multiple 1-D inverse transforms based on the selected pattern to recover the array of data elements from the transform coefficients.

Figure 5C:
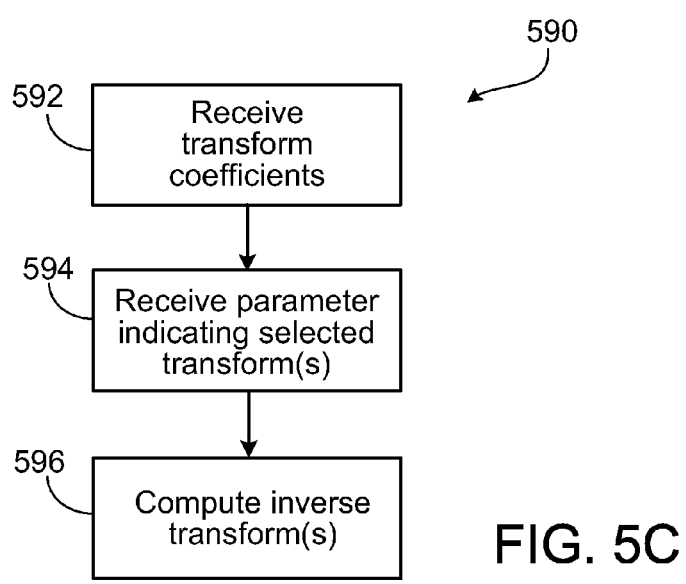

The operations performed in the decoding system may be different, for example, if the encoded parameters indicate how an array was encoded in other ways. For example, a parameter may identify transform(s) used to generate the selected set of transform coefficients from a group that includes one or more 2-D transforms and multiple patterns of 1-D transforms. FIG. 5C shows a flowchart 590 that represents an exemplary arrangement of operations performed in the decoding system for decoding encoded data received by the decoding system. The operations include receiving (592) encoded transform coefficients representing the array and one or more parameters related to the transform coefficients. Operations may also include receiving (594) one of the parameters that indicates selected transform(s) used to generate the selected set of transform coefficients. For example, the parameter can be a number from 1 to 12 to identify one of the sets of 1-D transforms corresponding to the 12 patterns of the example shown in FIG. 6A, and the parameter can be a number from 13 to 16 to identify a 2-D transform of a set of four possible 2-D transforms that could have been used to generate the selected transform coefficients. The operations also include computing (596) inverse transform(s) (e.g., a single 2-D inverse transform, or multiple 1-D inverse transforms) to recover the array of data elements from the transform coefficients.

Figure 6A:
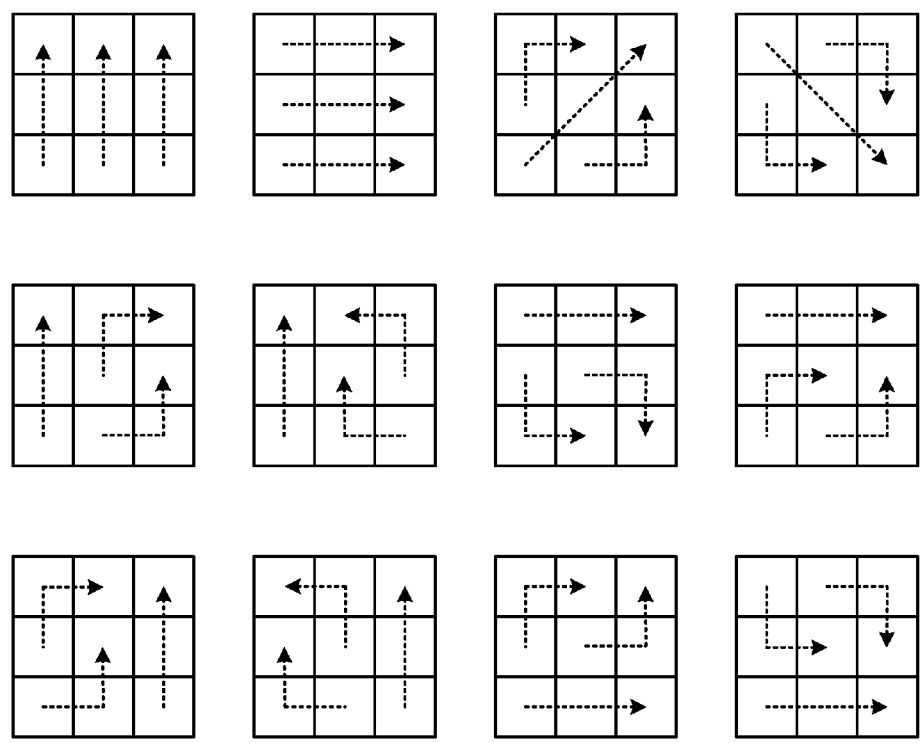
FIGS. 6A and 6B are plots of exemplary patterns for arranging 1-D transforms.

Referring now to FIG. 6A, an example is depicted where one-dimensional transforms are calculated over different subsets of data elements arranged in a predetermined pattern over an array (in this example, a 3×3 array). In this example, there are 12 patterns in which each subset is a one-dimensional sequence of contiguous data elements. Each pattern depicted here includes 3 subsets, each subset identified by a line through the data elements of that subset. A transform is performed over the data elements in a predetermined order, depicted here by the direction of the arrow. For a particular array of data element, different patterns will typically provide different degrees of compression in the transforms that are computed over the subsets. For example, the number of non-zero coefficients that remain after quantization of the transform coefficients may be higher or lower for certain patterns, depending on the values and spatial distribution of the data elements. Some patterns may provide better compression of the non-zero quantized transform coefficients after subsequent processing (e.g., after run-length encoding). The pattern that provides the most compression can be selected, using the procedure described above.

The subsets of data elements can be selected to have certain properties. In some implementations, the subsets of data elements are chosen such that the subsets are mutually exclusive and exhaustive. In this example, the subsets of each pattern have this characteristic, such that each data element of the array is included in a single one of the subsets of that pattern. In some impementations, the subsets include contiguous data elements. In this example, the data elements are contiguous, with successive data elements being adjacent vertically, horizontally, or diagonally, in the two-dimensional array. In some implementations, the subsets of data elements are chosen such that they each have substantially the same number of data elements. In this example, each subset has 3 data elements.

As discussed above, it may be advantageous to arrange each subset to have the same number of data elements so that subsequent encoding (e.g., run-length encoding) can be performed more efficiently. For example, using the same number of data elements may enable the computational algorithm that is used for each of the 1-D transforms performed on respective subsets to use the same operations (including the same number of operations), which may simplify the implementation. For example, the number of operations carried out for a 3-point DCT may be different from the number of operations that would be carried out for a 4-point DCT. Additionally, for 1-D transform vectors of the same size, corresponding coefficients in the 1-D transform vectors correspond to the same spatial frequency component. As a result, the transform coefficients can be grouped more easily and efficiently for run-length encoding, as shown in the "1-D transforms" example of FIG. 4.

In one approach for providing different arrangements of subsets of data elements in different patterns, while still providing the characteristics above (that subsets are mutually exclusive and exhaustive, contiguous, and that each subset includes the same number of data elements), some subsets included in some patterns consist of sequences of data elements that are "bent," that is, the data elements are contiguous but are not in a contiguous sequence along a single dimension (e.g., a single horizontal dimension, a single vertical dimension, or a single diagonal dimension). In this example, 10 of the 12 patterns include bent sequences of data elements.

Figure 6B:
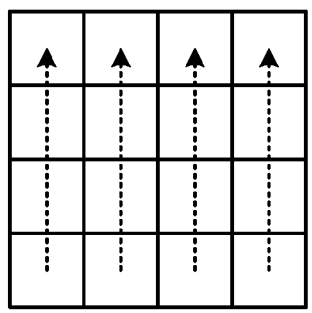
Figure 6B:
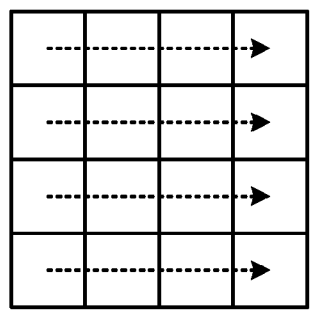
Figure 6B:
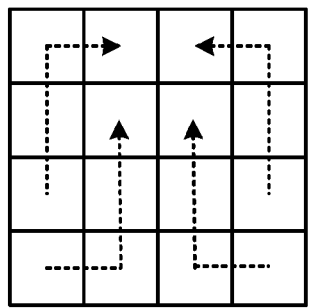
Figure 6B:
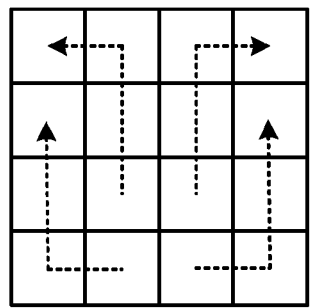
Figure 6B:
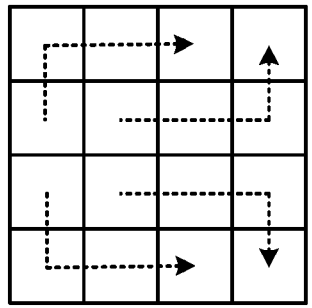
Figure 6B:
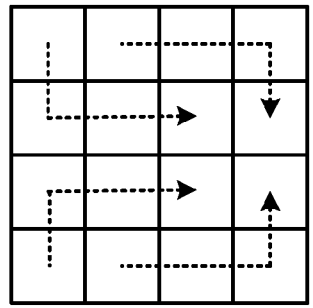
Figure 6B:
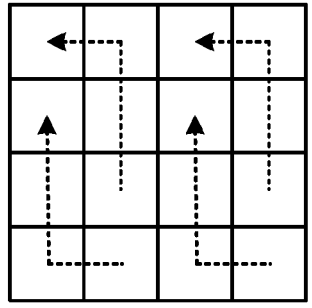
Figure 6B:
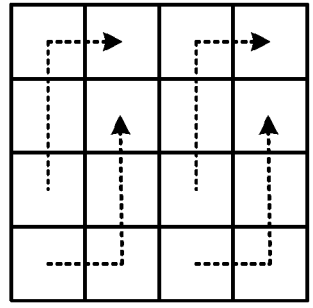

FIG. 6B shows another example where one-dimensional transforms are calculated over different subsets of data elements arranged in a predetermined pattern over an array (in this example, a 4×4 array). In this example, only 8 patterns are depicted, however, additional patterns may be included in the set of candidate patterns for encoding the array. This example also provides patterns having the characteristics above (that subsets are mutually exclusive and exhaustive, contiguous, and that each subset includes the same number of data elements). The sets of patterns in both examples (of FIG. 6A and FIG. 6B), include the two patterns of uniform horizontal subsets and uniform vertical subsets. It may be useful to include these two basic patterns when selecting a set of patterns, for example, since some arrays may include features that are vertically or horizontally aligned. In some implementations, the other patterns included in the set can have certain other properties or symmetries. For example, in both examples, the remaining patterns include some patterns that are either mirror images of each other or are rotated versions of each other. For simplicity, or to limit the number of potential patterns, certain restrictions can be made in determining which patterns to include in a set. In these examples, the subsets that consist of bent sequences include only a single "bend" (or change of direction). Such subsets consist of a contiguous sequence of data elements that includes a first contiguous section along a first dimension and a second contiguous section along a second dimension. Another restriction that may be used in some implementations is that the dimensions are orthogonal to each other (e.g., horizontal and vertical).

Figure 7:
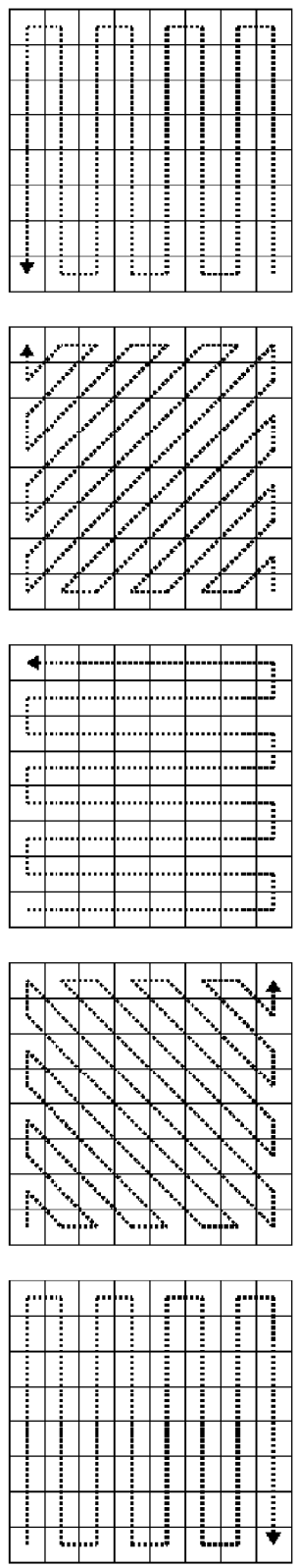
FIG. 7 is a set of plots of exemplary scanning patterns.

As described above, the transform coefficients can be read from the two-dimensional array of coefficients in a specific order known as a scanning pattern. Typically, such scanning patterns may be defined such that lower frequency coefficients are scanned before higher frequency coefficients and/or such that a coefficient is read before or after another coefficient stored in an adjacent location in the array of results. FIG. 7 depicts some example scanning patterns for 8×8 arrays of coefficients. The scanning pattern traces a path that includes all of the non-zero coefficients, and any zero coefficients that occur between other non-zero coefficients. Any remaining zero coefficients after the last non-zero coefficients have been scanned do not need to be included in the scanning pattern. In some implementations, the path of the scanning pattern can be determined to increase the efficiency of subsequent run-length encoding that is to be performed. For example, the scanning pattern can increase the number of non-zero coefficients that occur in the earlier part of the scanned sequence of coefficients.

The compression techniques described above can be implemented using software for execution on a computer system. For instance, the software defines procedures in one or more computer programs that execute on one or more programmed or programmable computer systems (e.g., desktop, distributed, client/server computer systems) each including at least one processor, at least one data storage system (e.g., including volatile and non-volatile memory and/or storage elements), at least one input device (e.g., keyboard and mouse) or port, and at least one output device (e.g., monitor) or port. The software may form one or more modules of a larger program.

The software may be provided on a computer-readable storage medium, such as a CD-ROM, readable by a general or special purpose programmable computer or delivered over a communication medium (e.g., encoded in a propagated signal) such as network to a computer where it is executed. Each such computer program is preferably stored on or downloaded to a storage medium (e.g., solid state memory or media, or magnetic or optical media) readable by a general or special purpose programmable computer, for configuring and operating the computer system when the storage medium is read by the computer system to perform the procedures of the software.

Other implementations are within the scope of the following claims.

What is claimed is:

1. A method of encoding data, the method comprising:
    determining multiple patterns for computing one-dimensional transforms over a first array of data elements, where each pattern includes multiple subsets of data elements of the first array, each subset that is included in a first pattern has substantially the same number of data elements as each of the other subsets that are included in the first pattern, each data element of the first array is included in a single one of the subsets included in the first pattern, and at least one subset included in the first pattern consists of data elements that are not in a contiguous sequence along a single dimension;
    computing, for each pattern of the multiple patterns, multiple one-dimensional transforms over data elements of respective subsets included in the pattern, to provide a set of transform coefficients corresponding to the pattern;
    selecting a set of transform coefficients from a group of multiple sets of transform coefficients, the group including the sets of transform coefficients corresponding to respective ones of the multiple patterns; and
    encoding the selected set of transform coefficients to represent the first array.

2. The method of claim 1, wherein each of the subsets included in each of the multiple patterns includes exactly the same number of data elements as each of the other subsets.

3. The method of claim 1, wherein each of the subsets included in each of the multiple patterns consists of a sequence of contiguous data elements.

4. The method of claim 3, wherein the first array comprises a two-dimensional arrangement of the data elements, and at least one of the subsets included in the first pattern comprises a contiguous sequence of data elements that includes a first contiguous section along a first dimension and a second contiguous section along a second dimension.

5. The method of claim 4, wherein the second dimension is orthogonal to the first dimension.

6. The method of claim 4, wherein the second dimension is orthogonal to the first dimension.

7. The method of claim 4, wherein the second dimension is orthogonal to the first dimension.

8. The method of claim 3, wherein the first array comprises a two-dimensional arrangement of the data elements, and at least one of the subsets included in the first pattern comprises a contiguous sequence of data elements that includes a first contiguous section along a first dimension and a second contiguous section along a second dimension.

9. The method of claim 3, wherein the first array comprises a two-dimensional arrangement of the data elements, and at least one of the subsets included in the first pattern comprises a contiguous sequence of data elements that includes a first contiguous section along a first dimension and a second contiguous section along a second dimension.

10. The method of claim 1, wherein the group of multiple sets of transform coefficients consists of the sets of transform coefficients corresponding to respective ones of the multiple patterns.

11. The method of claim 10, wherein encoding the selected set of transform coefficients to represent the first array includes encoding information indicating which of the multiple patterns corresponds to the selected set of transform coefficients.

12. The method of claim 10, wherein encoding the selected set of transform coefficients to represent the first array includes encoding information indicating which of the multiple patterns corresponds to the selected set of transform coefficients.

13. The method of claim 10, wherein encoding the selected set of transform coefficients to represent the first array includes encoding information indicating which of the multiple patterns corresponds to the selected set of transform coefficients.

14. The method of claim 1, wherein the group of multiple sets of transform coefficients includes at least one set of transform coefficients based on a two-dimensional transform computed over the data elements of the first array.

15. The method of claim 14, wherein encoding the selected set of transform coefficients to represent the first array includes encoding one or more parameters identifying at least one transform used to generate the selected set of transform coefficients.

16. The method of claim 15, wherein the one or more parameters include a parameter that identifies a member of a group that includes multiple sets of one-dimensional transforms and one or more two-dimensional transforms.

17. The method of claim 15, wherein the one or more parameters include a parameter that identifies at least one transform by identifying one of the multiple patterns.

18. The method of claim 15, wherein the one or more parameters include a parameter that indicates whether the first array was transformed using a two-dimensional transform or using multiple one-dimensional transforms.

19. The method of claim 15, wherein the one or more parameters include a parameter that identifies a member of a group that includes multiple sets of one-dimensional transforms and one or more two-dimensional transforms.

20. The method of claim 15, wherein the one or more parameters include a parameter that identifies at least one transform by identifying one of the multiple patterns.

21. The method of claim 15, wherein the one or more parameters include a parameter that indicates whether the first array was transformed using a two-dimensional transform or using multiple one-dimensional transforms.

22. The method of claim 15, wherein the one or more parameters include a parameter that identifies a member of a group that includes multiple sets of one-dimensional transforms and one or more two-dimensional transforms.

23. The method of claim 15, wherein the one or more parameters include a parameter that identifies at least one transform by identifying one of the multiple patterns.

24. The method of claim 15, wherein the one or more parameters include a parameter that indicates whether the first array was transformed using a two-dimensional transform or using multiple one-dimensional transforms.

25. The method of claim 14, wherein encoding the selected set of transform coefficients to represent the first array includes encoding one or more parameters identifying at least one transform used to generate the selected set of transform coefficients.

26. The method of claim 14, wherein encoding the selected set of transform coefficients to represent the first array includes encoding one or more parameters identifying at least one transform used to generate the selected set of transform coefficients.

27. The method of claim 1, wherein a set of transform coefficients is selected from the group of multiple sets of transform coefficients based at least in part on which set of transform coefficients is encoded to represent the first array with a maximum compression.

28. The method of claim 27, wherein the selected set of transform coefficients is encoded to represent the first array based at least in part on run-length encoding.

29. The method of claim 27, wherein the selected set of transform coefficients is encoded to represent the first array based at least in part on run-length encoding.

30. The method of claim 27, wherein the selected set of transform coefficients is encoded to represent the first array based at least in part on run-length encoding.

31. The method of claim 1, wherein each set of transform coefficients in the group of multiple sets of transform coefficients is computed based on at least one transform from a group of multiple transforms.

32. The method of claim 1, wherein the first array of data elements is associated with a video frame.

33. The method of claim 32, wherein the first array of data elements corresponds to a block of pixels of the video frame.

34. The method of claim 32, wherein the first array of data elements is associated with a residual computed from two video frames.

35. The method of claim 34, wherein the residual is obtained by subtracting pixel values of one of the frames from corresponding pixel values in the other of the frames.

36. The method of claim 34, wherein the residual is obtained by subtracting pixel values of one of the frames from corresponding pixel values in the other of the frames.

37. The method of claim 34, wherein the residual is obtained by subtracting pixel values of one of the frames from corresponding pixel values in the other of the frames.

38. The method of claim 32, wherein the first array of data elements corresponds to a block of pixels of the video frame.

39. The method of claim 32, wherein the first array of data elements is associated with a residual computed from two video frames.

40. The method of claim 32, wherein the first array of data elements corresponds to a block of pixels of the video frame.

41. The method of claim 32, wherein the first array of data elements is associated with a residual computed from two video frames.

42. A non-transitory computer-readable medium storing a computer program for encoding data, the computer program comprising instructions for causing a computer system to:
   determine multiple patterns for computing one-dimensional transforms over a first array of data elements, where each pattern includes multiple subsets of data elements of the first array, each subset that is included in a first pattern has substantially the same number of data elements as each of the other subsets that are included in the first pattern, each data element of the first array is included in a single one of the subsets included in the first pattern, and at least one subset included in the first pattern consists of data elements that are not in a contiguous sequence along a single dimension;
   compute, for each pattern of the multiple patterns, multiple one-dimensional transforms over data elements of respective subsets included in the pattern, to provide a set of transform coefficients corresponding to the pattern;
   select a set of transform coefficients from a group of multiple sets of transform coefficients, the group including the sets of transform coefficients corresponding to respective ones of the multiple patterns; and
   encode the selected set of transform coefficients to represent the first array.

43. The non-transitory computer-readable medium of claim 42, wherein each of the subsets included in each of the multiple patterns includes exactly the same number of data elements as each of the other subsets.

44. The non-transitory computer-readable medium of claim 42, wherein each of the subsets included in each of the multiple patterns consists of a sequence of contiguous data elements.

45. The non-transitory computer-readable medium of claim 42, wherein the group of multiple sets of transform coefficients consists of the sets of transform coefficients corresponding to respective ones of the multiple patterns.

46. The non-transitory computer-readable medium of claim 42, wherein the group of multiple sets of transform coefficients includes at least one set of transform coefficients based on a two-dimensional transform computed over the data elements of the first array.

47. The non-transitory computer-readable medium of claim 42, wherein a set of transform coefficients is selected from the group of multiple sets of transform coefficients based at least in part on which set of transform coefficients is encoded to represent the first array with a maximum compression.

48. The non-transitory computer-readable medium of claim 42, wherein each set of transform coefficients in the group of multiple sets of transform coefficients is computed based on at least one transform from a group of multiple transforms.

49. The non-transitory computer-readable medium of claim 42, wherein the first array of data elements is associated with a video frame.

50. A system, comprising:
a transmitter configured to
 determine multiple patterns for computing one-dimensional transforms over a first array of data elements, where each pattern includes multiple subsets of data elements of the first array, each subset that is included in a first pattern has substantially the same number of data elements as each of the other subsets that are included in the first pattern, each data element of the first array is included in a single one of the subsets included in the first pattern, and at least one subset included in the first pattern consists of data elements that are not in a contiguous sequence along a single dimension,
 compute, for each pattern of the multiple patterns, multiple one-dimensional transforms over data elements of respective subsets included in the pattern, to provide a set of transform coefficients corresponding to the pattern,
 select a set of transform coefficients from a group of multiple sets of transform coefficients, the group including the sets of transform coefficients corresponding to respective ones of the multiple patterns, and
 encode the selected set of transform coefficients to represent the first array; and one or more receivers, each receiver configured to
 receive encoded transform coefficients and one or more parameters related to the transform coefficients from the transmitter, and
 compute one or more inverse transforms on the transform coefficients to generate the first array of data elements based on the pattern corresponding to the selected set of transform coefficients indicated by at least one of the parameters related to the transform coefficients.

51. The system of claim 50, wherein each of the subsets included in each of the multiple patterns includes exactly the same number of data elements as each of the other subsets.

52. The system of claim 50, wherein each of the subsets included in each of the multiple patterns consists of a sequence of contiguous data elements.

53. The system of claim 50, wherein the group of multiple sets of transform coefficients consists of the sets of transform coefficients corresponding to respective ones of the multiple patterns.

54. The system of claim 50, wherein the group of multiple sets of transform coefficients includes at least one set of transform coefficients based on a two-dimensional transform computed over the data elements of the first array.

55. The system of claim 50, wherein a set of transform coefficients is selected from the group of multiple sets of transform coefficients based at least in part on which set of transform coefficients is encoded to represent the first array with a maximum compression.

56. The system of claim 50, wherein each set of transform coefficients in the group of multiple sets of transform coefficients is computed based on at least one transform from a group of multiple transforms.

57. The system of claim 50, wherein the first array of data elements is associated with a video frame.

* * * * *